United States Patent
Ma et al.

(10) Patent No.: US 9,193,005 B2
(45) Date of Patent: Nov. 24, 2015

(54) CONTACT TIP WITH CONTOURED BORE

(71) Applicant: Illinois Tool Works Inc., Glenview, IL (US)

(72) Inventors: Tiejun Ma, Tecumseh (CA); Romeo N. Cossette, Windsor (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 309 days.

(21) Appl. No.: 13/632,928

(22) Filed: Oct. 1, 2012

(65) Prior Publication Data

US 2013/0105453 A1   May 2, 2013

Related U.S. Application Data

(60) Provisional application No. 61/554,621, filed on Nov. 2, 2011.

(51) Int. Cl.
| | |
|---|---|
| *B23K 9/28* | (2006.01) |
| *B23K 9/26* | (2006.01) |
| *B23K 9/173* | (2006.01) |
| *B23K 9/29* | (2006.01) |

(52) U.S. Cl.
CPC . *B23K 9/26* (2013.01); *B23K 9/173* (2013.01); *B23K 9/295* (2013.01)

(58) Field of Classification Search
USPC ................ 219/137.61, 121.5, 121.48, 137.31
See application file for complete search history.

(56) References Cited

U.S. PATENT DOCUMENTS

| | | |
|---|---|---|
| 3,366,774 A | 1/1968 | Nuss et al. |
| 3,444,353 A | 5/1969 | Wilson et al. |
| 3,470,349 A | 9/1969 | Sievers et al. |
| 3,502,841 A | 3/1970 | Heer et al. |
| 3,818,175 A | 6/1974 | Essers et al. |
| 4,450,341 A | 5/1984 | Dietrick et al. |
| 4,560,858 A | 12/1985 | Manning |
| 4,575,612 A | 3/1986 | Prunier |
| 4,733,052 A | 3/1988 | Nilsson et al. |

(Continued)

FOREIGN PATENT DOCUMENTS

| | | |
|---|---|---|
| CN | 201175802 Y | 1/2009 |
| JP | 53084847 A | 7/1978 |

(Continued)

OTHER PUBLICATIONS

International Search Report from PCT application No. PCT/US2012/062092 dated Jan. 30, 2013, 14 pgs.

*Primary Examiner* — Brian Jennison
(74) *Attorney, Agent, or Firm* — Fletcher Yoder P.C.

(57) ABSTRACT

The welding contact tips presented herein include contoured inner bores that include a front inner bore section and a back inner bore section. In certain embodiments, the front inner bore section is approximately 0.3-0.6 inches long and includes an inner wall having a substantially constant inner diameter. The back inner bore section is configured to conform to the specific welding wire used with the welding contact tip. In particular, the back inner bore section includes an inner wall having an inner diameter that is substantially larger at an axial end of the welding contact tip than at an axial transition location where the front and back inner bore sections abut. As such, the welding contact area between the welding contact tip and the welding wire is enhanced in the front inner bore section, especially when the welding wire twists inside the contact tip and the welding torch.

20 Claims, 5 Drawing Sheets

(56) References Cited

U.S. PATENT DOCUMENTS

| | | | |
|---|---|---|---|
| 4,937,428 | A | 6/1990 | Yoshinaka et al. |
| 4,988,846 | A | 1/1991 | Karlsten et al. |
| 5,101,093 | A | 3/1992 | Matsui et al. |
| 5,514,851 | A | 5/1996 | Siewert et al. |
| 5,556,562 | A | 9/1996 | Sorenson |
| 5,635,091 | A | 6/1997 | Hori et al. |
| 5,726,420 | A | 3/1998 | Lajoie |
| 6,093,907 | A | 7/2000 | Hidaka |
| 6,429,406 | B1 | 8/2002 | Sattler |
| 6,437,288 | B1 | 8/2002 | Lefebvre et al. |
| 6,559,416 | B1 | 5/2003 | Steenis et al. |
| 6,710,300 | B2 | 3/2004 | Steenis et al. |
| 6,943,318 | B2 | 9/2005 | Takagi et al. |
| 7,271,366 | B2 | 9/2007 | Kensrue |
| 7,381,923 | B2 | 6/2008 | Gordon et al. |
| 7,557,327 | B2 | 7/2009 | Matthews et al. |
| 2002/0088787 | A1 | 7/2002 | Ziegler et al. |
| 2004/0079741 | A1 | 4/2004 | Keegan |
| 2005/0252900 | A1 | 11/2005 | Matthews et al. |
| 2008/0035623 | A1 | 2/2008 | Hutchison |
| 2008/0061050 | A1 | 3/2008 | Walters |
| 2008/0230529 | A1 | 9/2008 | Rich |
| 2008/0272101 | A1 | 11/2008 | Oh et al. |
| 2009/0045183 | A1 | 2/2009 | Artelsmair et al. |
| 2009/0107958 | A1 | 4/2009 | Khakhalev |
| 2009/0107971 | A1 | 4/2009 | Ruhrnossl et al. |
| 2009/0294427 | A1 | 12/2009 | Matthews et al. |
| 2010/0314374 | A1 | 12/2010 | Ma |
| 2010/0320184 | A1 | 12/2010 | Enyedy et al. |
| 2011/0006048 | A1 | 1/2011 | Ma |
| 2011/0036821 | A1* | 2/2011 | Ruehrnoessl et al. ........ 219/136 |
| 2011/0073581 | A1 | 3/2011 | Ma |
| 2011/0204035 | A1 | 8/2011 | Grossauer et al. |

FOREIGN PATENT DOCUMENTS

| | | |
|---|---|---|
| JP | 5008045 A | 1/1993 |
| JP | 5077048 A | 3/1993 |

* cited by examiner

CONTACT TIP WITH CONTOURED BORE

CROSS-REFERENCE TO RELATED APPLICATIONS

This application is a Non-Provisional Patent Application of U.S. Provisional Patent Application No. 61/554,621, entitled "Contact Tip with Contoured Bore", filed on Nov. 2, 2011, which is herein incorporated by reference.

BACKGROUND

The present invention relates generally to contact tips (e.g., contact tubes) for gas metal arc welding applications.

A range of welding applications and apparatus are known in the field, typically adapted for a particular type of welding operation. For example, in certain operations commonly referred to as gas metal arc welding (GMAW) or metal inert gas (MIG) welding, a wire is fed from a spool or drum through a welding torch. An electrical charge is placed on the wire via the torch and, as the wire approaches a grounded work piece, an arc is formed. The arc heats the work piece as well as the wire, melting the weld location and adding the wire to the weldment. A shielding gas is applied via the torch that surrounds a progressive weld pool to aid in the formation of the weld and to protect the weld during solidification of the molten metal. Various arrangements and applications exist for wire feed welders. In general, these arrangements and applications function similar to the GMAW and MIG systems described above.

In all GMAW techniques, a persistent problem exists in maintaining good electrical contact between the wire and the charged portions of the torch. That is, the torch typically includes a series of electrically coupled conductive elements that convey charge to the wire as it passes through the torch. One of these elements is a contact tip, the main function of which is to transmit electrical current from the torch to the passing wire. However, because the wire must generally freely pass through the torch as it is driven by a motor and drive mechanism from a spool, less than optimal contact may be made at certain points in the operation. If contact is lost or temporarily interrupted between the contact tip and the wire, a degraded weld may result.

Various arrangements have been devised in attempts to maintain improved contact between the contact tip and welding wire. Certain proposed mechanisms include spring-enhanced contact tips, which tend to be relatively fragile and relatively expensive to manufacture. In addition, other proposed mechanisms include enhanced contacting mechanisms that include several opening slots on the surface of the contact tip. These designs are not practical insofar as welding spatter tends to get into the opening slots and can contaminate the contact tip-to-wire interface. Also, for all of these designs, the friction forces between the contact tip and wire are significantly increased, which can be a big challenge for GMAW on soft wires such as aluminum. There is a need, therefore, for improved techniques for maintaining good electrical contact between the contact tip and the welding wire.

BRIEF DESCRIPTION

In an exemplary embodiment, a welding contact tip includes a conductive body configured to be secured within a welding torch and to receive a welding wire through a contoured inner bore formed through the conductive body. The contoured inner bore includes a first inner bore extending from a first axial end of the conductive body to a first axial location along an axis through the contoured inner bore. The first inner bore includes a first inner wall having a first inner diameter that is substantially constant from the first axial end of the conductive body to the first axial location along the axis. The contoured inner bore also includes a second inner bore extending from the first axial location along the axis to a second axial location along the axis. The second axial location is proximate to a second axial end of the conductive body that is opposite the first axial end of the conductive body. The second inner bore comprises a second inner wall having a second inner diameter that increases from the first axial location to the second axial location along the axis.

In another embodiment, a welding contact tip includes a conductive body configured to be secured within a welding torch and to receive a welding wire through a contoured inner bore formed through the conductive body. The contoured inner bore includes a first inner bore extending approximately 0.3-0.6 inches from a first axial end of the conductive body to a first axial location along an axis through the contoured inner bore. The first inner bore includes a first inner wall having a first inner diameter that is substantially constant from the first axial end of the conductive body to the first axial location along the axis and is approximately 5-10% larger than an outer diameter of the welding wire received through the contoured inner bore. The contoured inner bore also includes a second inner bore extending approximately 0.6-1.0 inches from the first axial location along the axis to a second axial location along the axis. The second axial location is proximate to a second axial end of the conductive body that is opposite the first axial end of the conductive body. The second inner bore comprises a second inner wall having a second inner diameter that increases from the first axial location to the second axial location along the axis.

In another embodiment, a welding contact tip includes a conductive body configured to receive a welding wire through a contoured inner bore formed through the conductive body. The contoured inner bore includes first and second bores. The first bore includes a substantially constant inner diameter and the second bore includes an inner diameter that gradually increases from the first bore to an axial end of the conductive body.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
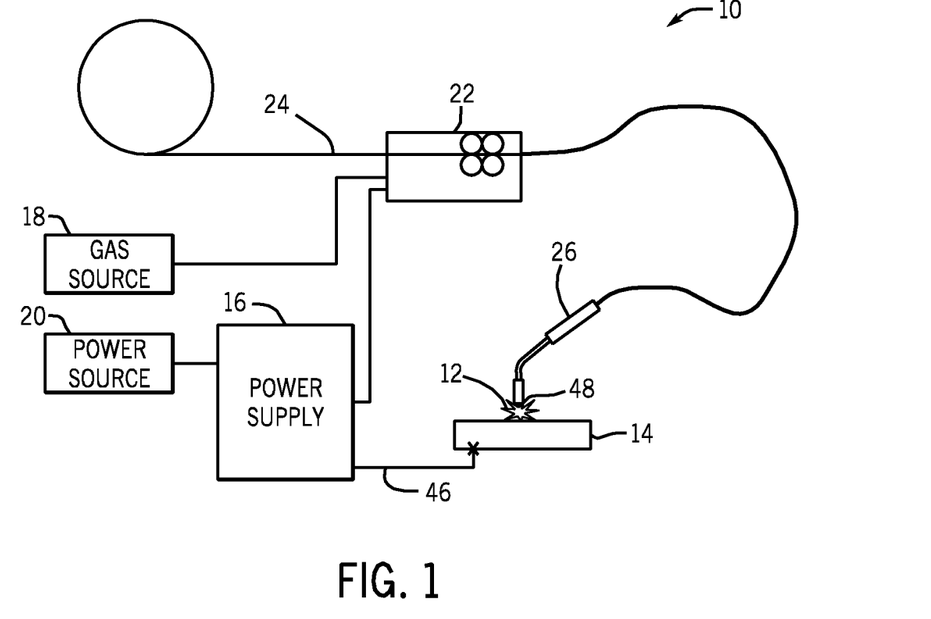
FIG. 1 is a block diagram of an embodiment of a welding system utilizing a contact tip having a contoured inner bore.

FIG. 1 is a block diagram of an embodiment of a welding system 10 utilizing a contact tip having a contoured inner bore. The welding system 10 is designed to produce a welding arc 12 on a work piece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 20, such as a power grid. Other power sources may, of course, be utilized including generators, engine-driven power packs, and so forth. A wire feeder 22 is coupled to a gas source 18 and the power source 20, and supplies welding wire 24 to a welding torch 26. The welding wire 24 is continuously fed through the welding torch 26 to the welding arc 12, molten by the welding arc 12, and deposited on the work piece 14. In addition, the work piece 14 is coupled to the power supply 16 through a grounding cable 46 to complete an electrical circuit when an electric arc is established between a contact tip 48 of the welding torch 26 and the work piece 14. As described in greater detail below, the contact tip 48 may include a contoured inner bore that enhances the electrical contact between the charged welding torch 26 and the welding wire 24 that is delivered through the contoured inner bore of the contact tip 48 of the welding torch 26.

Figure 2:
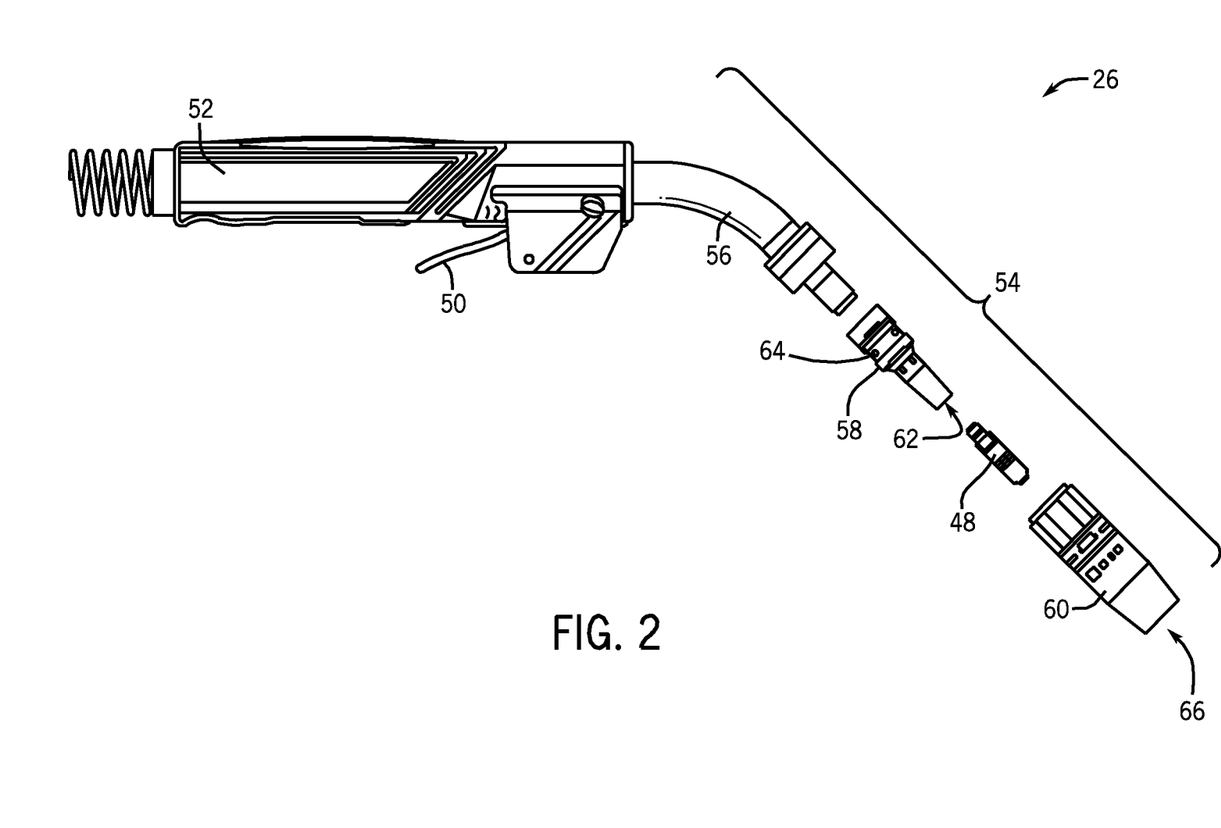
FIG. 2 is an exploded side view of an embodiment of front components of a welding torch of the welding system of FIG. 1 that utilizes the contact tip having a contoured inner bore.

FIG. 2 is an exploded side view of an embodiment of front components of the welding torch 26 of the welding system 10 of FIG. 1 that utilizes the contact tip 48 having a contoured inner bore. Advancement of the welding resources (e.g., welding current, welding wire 24, and shielding gas) is effectuated by actuation of a trigger 50 secured to a handle 52 of the welding torch 26. In certain embodiments, by depressing the trigger 50 of the welding torch 26, a switch (not shown) disposed within the trigger 50 is closed, causing the transmission of an electrical signal that commands delivery of the welding resources into the welding torch 26 and through the handle 52 to a neck assembly 54.

As illustrated in FIG. 2, in certain embodiments, the neck assembly 54 includes a gooseneck portion 56, a retaining head 58, the contact tip 48, and a nozzle 60. The retaining head 58 includes an inner annular seating location 62 within which the contact tip 48 is inserted and secured, such that the welding wire 24 may be delivered through the contoured inner bore of the contact tip 48, and the welding current may be transmitted from the retaining head 58 through the contact tip 48 and to the welding wire 24. The nozzle 60, when assembled with the retaining head 58 or gooseneck portion 56, provides insulated protection of the retaining head 58 and contact tip 48. The nozzle 60 also provides a channel for shielding gas to pass from diffusing holes 64 toward an outlet end 66 of the nozzle 60, where the welding arc will be.

As described above, the electrical current that passes through the contact tip 48 to the welding wire 24 causes arcing from the welding wire 24 to the work piece 14, which causes the welding wire 24 to transform into a molten state to create a weld. Different types of welding wire 24 may be used, each type of welding wire 24 having particular electrical and mechanical characteristics. For example, various aluminum wires have been increasingly used in recent years. However, aluminum welding wire presents particular issues relating to, among other things, the longevity of contact tips. For example, aluminum welding wire is always covered by a condensed oxide layer, which is relatively non-conductive. As such, a significant amount of contact is required between the inner bore of the contact tip and the aluminum welding wire for smooth energy transfer from the contact tip to the aluminum welding wire. However, the aluminum welding wire is also relatively soft, and as such cannot handle high friction forces from the inner bore of the contact tip as the aluminum welding wire moves through the contact tip. Furthermore, the aluminum oxide layer is relatively abrasive, thereby exacerbating problems with friction and wear between the aluminum welding wire and the contact tip.

Moreover, the relatively high thermal conductivity of aluminum alloys requires relatively high heat input to create a proper welding pool on the work piece 14. The relatively low melting temperature and enthalpy make burning of aluminum welding wire unstable. For example, an argon shielded aluminum arc may be so dynamic that specialized pulse control of the welding current (e.g., changing the pulse frequency, peak and background currents, and so forth) may be necessary to control the arcing. This requires a relatively complicated waveform for the welding current to be accurately delivered at the contact tip 48.

Furthermore, the contact tip 48 acts as a "fuse" in the welding system 10. In other words, the contact tip 48 should be the most replaceable component of the welding torch 26, instead of more expensive or more difficult to change components of the welding torch 26. With these considerations in mind, the contact tips 48 described herein include contoured inner bores that are relatively easily manufactured, but that are suitable for use in critical applications such as aluminum welding as described above. More specifically, the contact tips 48 described herein provide good contact and conduction between the contact tips 48 and the welding wire 24 delivered through the contact tips 48, while not significantly introducing friction forces between the contact tips 48 and the welding wire 24.

Figure 3:
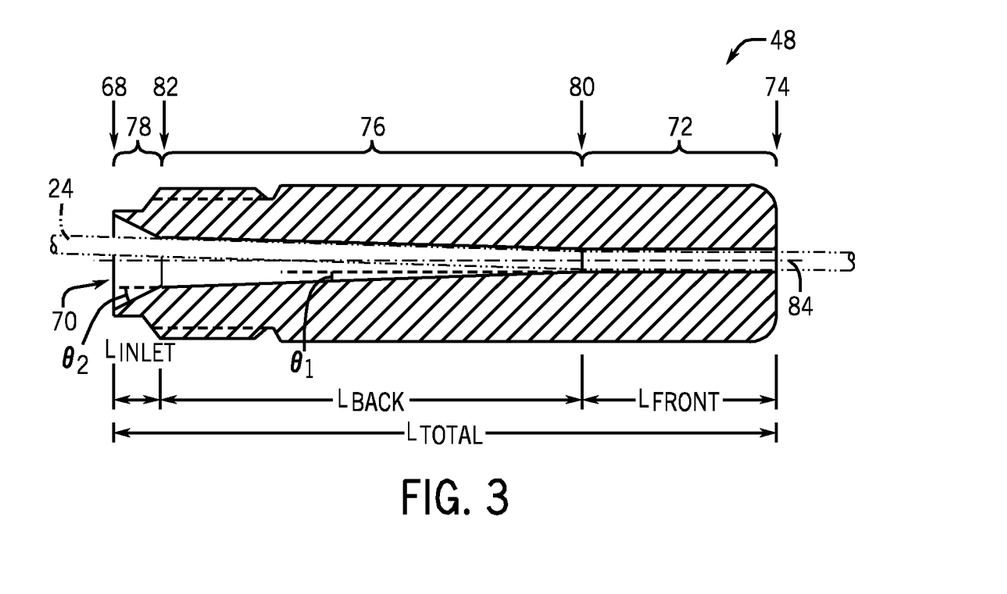
FIG. 3 is a cutaway side view of an embodiment of the contact tip having a contoured inner bore.

FIG. 3 is a cutaway side view of an embodiment of the contact tip 48 having a contoured inner bore 70. More specifically, as illustrated, in certain embodiments, the contoured inner bore 70 of the contact tip 48 includes a front inner bore 72 (an inner bore proximate to a distal end 74 of the contact tip 48) and a back inner bore 76 (an inner bore proximate to a proximal end 68 of the contact tip 48). In addition, as illustrated, in certain embodiments, the contact tip 48 includes a back inlet bore 78 proximal to the back inner bore 76. However, in other embodiments, the contact tip 48 may not include the back inlet bore 78. As described herein, the term "proximal" is intended to mean closer to the handle 52 along the neck assembly 54 of the welding torch 26, whereas the term "distal" is intended to mean farther away from the handle 52. As illustrated in FIG. 3, the contact tip 48 comprises a one-piece annular body, which as described above, is made of a material that is highly conductive, facilitating the welding current to be passed through to the welding wire 24 being delivered through the contoured inner bore 70 of the contact tip 48.

Conventional contact tips include inner bores having substantially constant inner diameters along the length of the contact tip. Due to the curvature or cast of the welding wire, contact tips having constant inner diameters tend to lead to minimal points of contact between the contact tip and the welding wire. For example, these minimal points of contact tend to be on one lateral side of the inner bore at the proximal end of the contact tip (proximal contact point), and on the opposite lateral side of the inner bore at the distal end of the contact tip (distal contact point).

Due to the fact that the inner diameter of the retaining head or liner are typically larger than that of the contact tip, the bending force of the welding wire 24 is generally higher at the proximal contact point than the distal contact point. While the welding wire 24 is subjected to feeding forces, friction forces, and electro-magnetic forces from the welding arc 12, it may vibrate dynamically inside the contact tip 48. A possibility exists that the distal contact point may be instantaneously loose or open, since the welding wire 24 pivots on the proximal contact point.

In addition, welding wires 24 (aluminum or steel) typically have an electrical resistance that is 60 to 1000 times higher than that of the contact tip 48. The welding current tends to transfer from the contact tip 48 to the weld at the distal contact point. When the distal contact point is loose or open: (a) the welding current is forced to transfer from the contact tip 48 to the welding wire 24 at the proximal contact point, which significantly increases the total resistance of the welding circuit, and (b) micro-arcing may occur between the contact tip 48 and the welding wire 24. The embodiments described herein address these issues by: (a) moving the major contact points toward the distal end 74 of the contact tip 48 to balance the mechanical bending forces at these two points, and reduce the fluctuation of the total resistance of the welding circuit, and (b) adding minor contact points near the proximal end 68 of the contact tip 48.

As illustrated in FIG. 3, in certain embodiments, the front inner bore 72 is a straight bore having a substantially constant inner diameter (e.g., varying by less than 0.5%, as an example). In certain embodiments, the front inner bore 72 may have a length $L_{front}$ in a range of approximately 0.3-0.6 inches, as compared to a total length $L_{total}$ of the contact tip 48 of approximately 1.0-1.5 inches. For example, in certain embodiments, the front inner bore 72 may have a length $L_{front}$ of approximately 0.4 inches, whereas the total length $L_{total}$ of the contact tip 48 may be approximately 1.3 inches. As such, in certain embodiments, the front inner bore 72 may have a length $L_{front}$ in a range of approximately 20-45% of the total length $L_{total}$ of the contact tip 48. For example, in certain embodiments, the front inner bore 72 may have a length $L_{front}$ that is approximately 30% of the total length $L_{total}$ of the contact tip 48.

As opposed to the substantially constant inner diameter, the back inner bore 76 (farthest away from the welding arc 12) has an inner diameter that increases from a first axial location 80 where the front inner bore 72 transitions into the back inner bore 76 to a second axial location 82 where the back inner bore 76 transitions into the back inlet bore 78 (e.g., an axial location that is proximate to the proximal end 68 of the contact tip 48). In particular, in the embodiment illustrated in FIG. 3, the inner diameter of the back inner bore 76 increases at a substantially constant rate from the first axial location 80 to the second axial location 82. For example, in certain embodiments, inner walls of the back inner bore 76 are angled with respect to an axis 84 of the contact tip 48 at a substantially constant angle $\theta_1$ in a range of approximately 0.5-3.5 degrees. More specifically, in certain embodiments, the angle $\theta_1$ may be in a range of approximately 1.0-2.5 degrees.

In certain embodiments, the back inner bore 76 may have a length $L_{back}$ in a range of approximately 0.6-1.0 inches, as compared to the total length $L_{total}$ of the contact tip 48 of approximately 1.0-1.5 inches. For example, in certain embodiments, the back inner bore 76 may have a length $L_{back}$ of approximately 0.8 inches, whereas the total length $L_{total}$ of the contact tip 48 may be approximately 1.3 inches. As such, in certain embodiments, the back inner bore 76 may have a length $L_{back}$ in a range of approximately 50-75% of the total length $L_{total}$ of the contact tip 48. For example, in certain embodiments, the back inner bore 76 may have a length $L_{back}$ that is approximately 60% of the total length $L_{total}$ of the contact tip 48.

In embodiments that include a back inlet bore 78, the back inlet bore 78 has an inner diameter that increases from the second axial location 82 where the back inner bore 76 transitions into the back inlet bore 78. The inner walls of the back inlet bore 78 are angled with respect to the axis 84 of the contact tip 48 at a substantially constant angle $\theta_2$ in a range of approximately 20-40 degrees. As such, the angle $\theta_2$ is substantially greater than the angle $\theta_1$. In certain embodiments, the back inlet bore 78 may have a length $L_{inlet}$ in a range of approximately 0.05-0.2 inches, as compared to the total length $L_{total}$ of the contact tip 48 of approximately 1.0-1.5 inches.

Because both the back inner bore 76 and the back inlet bore 78 have inner diameters that gradually increase along the length of the contact tip 48 from the front inner bore 72 toward the proximal end 68 of the contact tip 48, the contoured inner bore 70 of the contact tip 48 may be created using relatively simple techniques, like casting, forging, powder metallurgy, drilling/reaming, and so forth. Furthermore, the contoured inner bore 70 of the contact tip 48 generally conforms to the contour of the welding wire 24 when being fed into the contact tip 48. This contoured inner bore 70 enables more contact area between the contact tip 48 and the welding wire 24, thus reducing the contact resistance between the contact tip 48 and the welding wire 24 without increasing the feeding friction between the contact tip 48 and the welding wire 24.

In addition, the contoured inner bore 70 of the contact tip 48 allows the welding wire 24 to twist inside of the contact tip 48 without losing contact with the contact tip 48, especially at the distal end 74 (front end) of the contact tip 48. The welding wire 24 inevitably twists inside the welding torch 26, either due to the welding wire 24 uncoiling from a package, or from articulation of the welding torch 26. In conventional contact tips having inner bores with substantially constant inner diameters along their length, the welding wire typically pivots at the proximal end of the contact tip (e.g., having higher contact forces than at the distal end of the contact tip), and wipes the circumference of the inner bore near the distal end of the contact tip to finish the twist. As such, when this occurs, the front contact point is loose, and the welding wire is actually floating at the front contact point. The energy (e.g., the welding current) has to be transferred from the proximal end of the contact tip or somewhere else along the length of the inner bore where the welding wire wipes across. The large shifting distance of the contacting points creates high fluctuation of the total electrical resistance of the welding circuit, negatively affecting accurate delivery of the energy (welding current in a special waveform) to the welding arc. The wire twisting also causes micro-arcing near the distal end or the middle of the contact tip, and contributes to premature burn back of the welding wire inside the contact tip. The contact tips 48 described herein address these shortcomings by: (a) forcing the major contact points towards the distal end 74 (front end) of the contact tip 48, and (b) allowing the welding wire 24 to rotate inside the contoured inner bore 70 while maintain sufficient contact at the front contact tip.

As described above, the length $L_{front}$ of the front inner bore 72 is relatively short compared to the total length $L_{total}$ of the contact tip 48. The major back contact point is moved from the proximal end 68 of the contact tip 48 to the first axial location 80 of the contact tip 48. The contact force at the front contact point is also improved by this movement. When the welding wire 24 rotates and the welding current delivery point switches between the front contact point (at the distal end 74 of the contact tip 48) and the back contact point, the electric resistance change is reduced compared to that of conventional consistently bored contact tips. The contoured inner bore 70 provides extra contact points with the welding wire 24 as it conforms to the wire contour. As such, the probability of arc fluctuation and micro-arcing near the distal end 74 of the contact tip 48 is reduced, as well as the possibility of premature burn back.

In addition, due at least in part to the shorter length of the front inner bore 72 of the contact tip 48, the radial gap between the front inner bore 72 and the welding wire 24 that is used may be smaller in comparison to conventional contact tips having inner bores with substantially constant inner diameters along their length, without sacrifice feedability or increasing the feeding friction. For example, in certain embodiments, the inner diameter of the front inner bore 72 may be 5-10% larger than the outer diameter of the welding wire 24 for steel wire, or 10-15% larger than the outer diameter of the welding wire 24 for aluminum wire. This decreased radial gap between the front inner bore 72 and the welding wire 24 improves the wire-contact tip conducting and enhances alignment of the weld.

In certain embodiments, the contoured inner bores 70 may be made by manufacturing methods such as step drilling, drilling with a pre-shaped drilling tool, using electric discharge machining (EDM), and so forth. Alternatively, the contoured inner bores 70 may be made by forging the contact tips 48 over a pre-shaped mandrel, like rotary forging or pushing the contact tips 48 through a die. The contoured inner bores 70 may also be made by methods of casting such as investment casting, die casting, and so forth. The contoured inner bores 70 may also be made by methods of powder metallurgy.

Figure 4:
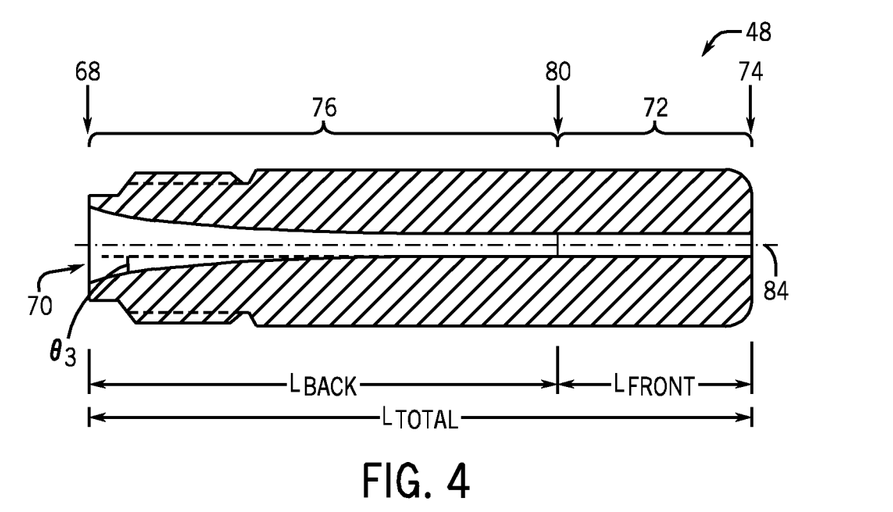
FIG. 4 is a cutaway side view of an embodiment of the contact tip having a contoured inner bore with a convex back inner bore.

FIGS. 4-7 illustrate other embodiments of the contact tip 48 that function similarly to the contact tip 48 illustrated in FIG. 3. Indeed, the dimensions and other characteristics of the contact tip 48 described above with respect to FIG. 3 may similarly apply to the contacts tips 48 illustrated in FIG. 4-7. FIG. 4 is a cutaway side view of an embodiment of the contact tip 48 having a contoured inner bore 70 with a convex back inner bore 76. The inner diameter of the back inner bore 76 increases at a gradually increasing rate from the first axial location 80 toward the proximal end 68 of the contact tip 48. More specifically, in certain embodiments, inner walls of the back inner bore 76 are angled with respect to the axis 84 of the contact tip 48 at an angle $\theta_3$ that increases from approximately 0 degrees at the first axial location 80 to a range of approximately 10-40 degrees at the proximal end 68 of the contact tip 48, such that the inner walls form a generally convex shape when viewed from the side. It should be noted that although the embodiment illustrated in FIG. 4 does not include a back inlet bore 78, it will be understood that the contact tip 48 illustrated in FIG. 4 may include a back inlet bore 78 in addition to the back inner bore 76 in certain embodiments.

Figure 5:
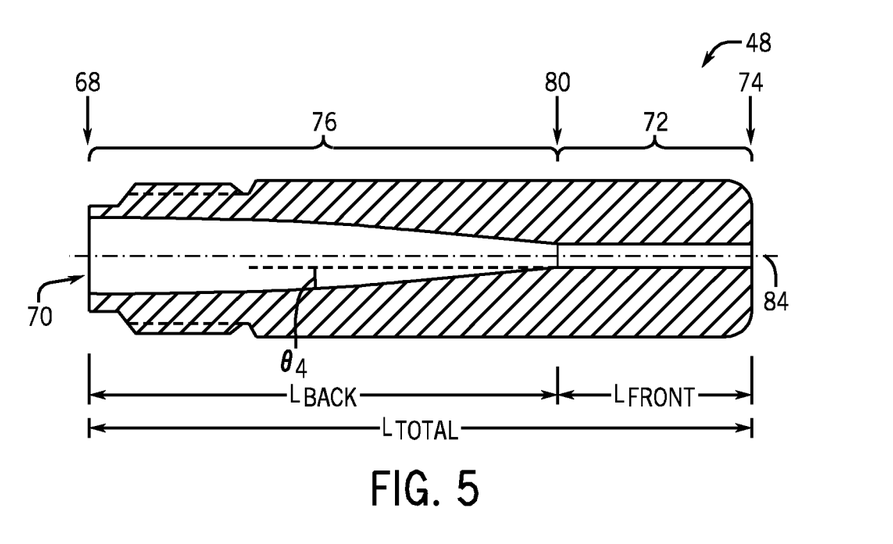
FIG. 5 is a cutaway side view of an embodiment of the contact tip having a contoured inner bore with a concave back inner bore.

FIG. 5 is a cutaway side view of an embodiment of the contact tip 48 having a contoured inner bore 70 with a concave back inner bore 76. The diameter of the back inner bore 76 increases at a gradually decreasing rate from the first axial location 80 toward the proximal end 68 of the contact tip 48. More specifically, in certain embodiments, inner walls of the back inner bore 76 are angled with respect to the axis 84 of the contact tip 48 at an angle $\theta_4$ that decreases from a range of approximately 10-30 degrees at the first axial location 80 to approximately 0 degrees at the proximal end 68 of the contact tip 48, such that the inner walls form a generally concave shape when viewed from the side. In certain embodiments, the angle $\theta_4$ may decrease from a range of approximately 10-15 degrees at the first axial location 80 to approximately 0 degrees at the proximal end 68 of the contact tip 48. Again, it should be noted that although the embodiment illustrated in FIG. 5 does not include a back inlet bore 78, it will be understood that the contact tip 48 illustrated in FIG. 5 may include a back inlet bore 78 in addition to the back inner bore 76 in certain embodiments.

Figure 6:
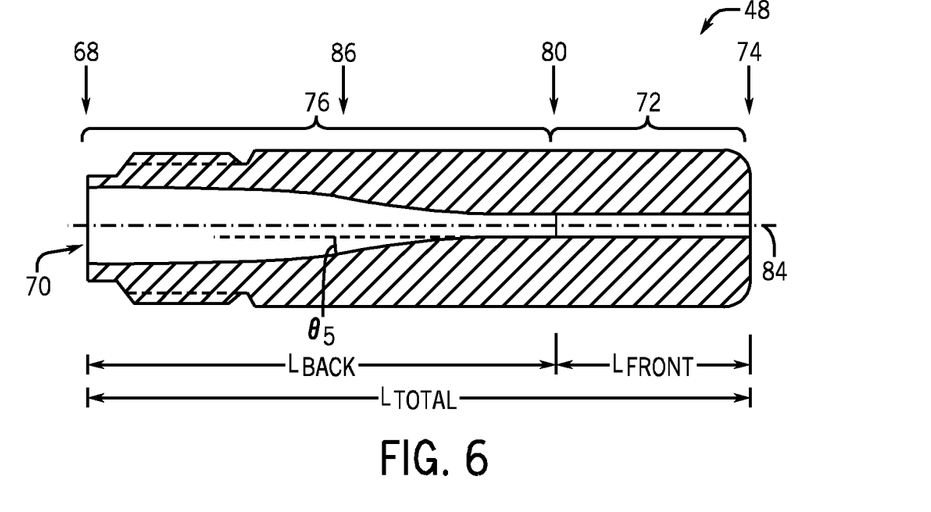
FIG. 6 is a cutaway side view of an embodiment of the contact tip having a contoured inner bore with a joint concave and convex back inner bore.

FIG. 6 is a cutaway side view of an embodiment of the contact tip 48 having a contoured inner bore 70 with a joint concave and convex back inner bore 76. Instead of having a back inner bore 76 with an inner diameter that increases at a gradually increasing or decreasing rate from the first axial location 80 toward the proximal end 68 of the contact tip 48, the contact tip 48 illustrated in FIG. 6 includes a back inner bore 76 having an inner diameter that increases at a gradually increasing rate from the first axial location 80 toward the proximal end 68 of the contact tip 48 until a point at a transition axial location 86 along the length of the contact tip 48. At the transition axial location 86, the inner diameter of the back inner bore 76 begins increasing at a gradually decreasing rate from the transition axial location 86 to the proximal end 68 of the contact tip 48. More specifically, in certain embodiments, inner walls of the back inner bore 76 are angled with respect to the axis 84 of the contact tip 48 at an angle $\theta_5$ that increases from approximately 0 degrees at the first axial location 80 to a range of approximately 5-15 degrees at the transition axial location 86, and then decreases from the range of approximately 5-15 degrees at the transition axial location 86 to approximately 0 degrees at the proximal end 68 of the contact tip 48. As such, the inner walls of the back inner bore 76 form a joint concave/convex shape when viewed from the side. In certain embodiments, the angle $\theta_5$ may increase from approximately 0 degrees at the first axial location 80 to approximately 10 degrees at the transition axial location 86, and then decreases from approximately 10 degrees at the transition axial location 86 to approximately 0 degrees at the proximal end 68 of the contact tip 48. Again, it should be noted that although the embodiment illustrated in FIG. 6 does not include a back inlet bore 78, it will be understood that the contact tip 48 illustrated in FIG. 6 may include a back inlet bore 78 in addition to the back inner bore 76 in certain embodiments.

Figure 7:
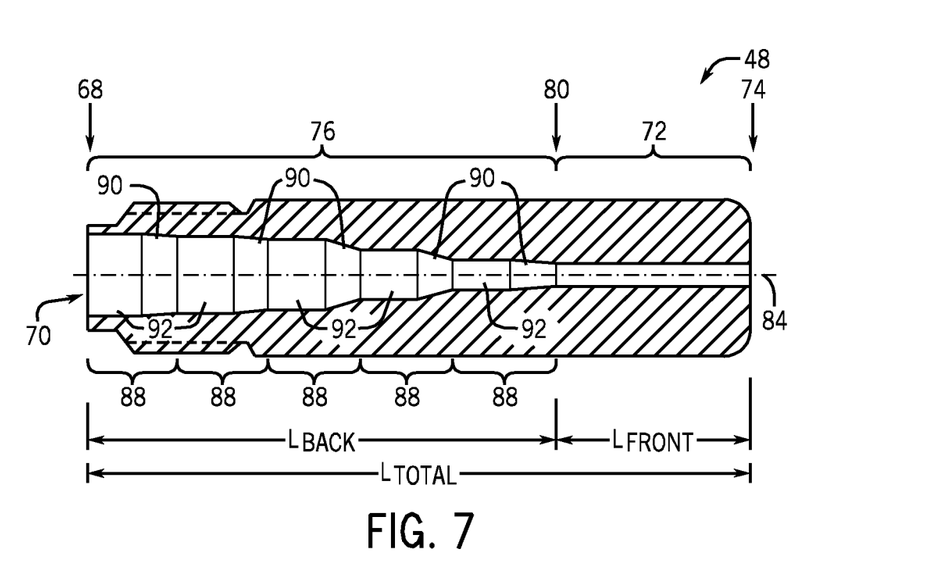
FIG. 7 is a cutaway side view of an embodiment of the contact tip having a contoured inner bore with a plurality of stepped bore segments.

FIG. 7 is a cutaway side view of an embodiment of the contact tip 48 having a contoured inner bore 70 with a plurality of stepped bore segments 88. More specifically, as illustrated in FIG. 7, each of the stepped bore segments 88 may have a distal bore segment 90 having an inner diameter that increases a substantially constant rate toward the proximal end 68 of the contact tip 48, and a proximal bore segment 92 having a substantially constant inner diameter. The angle of each of the distal bore segments 90 with respect to the axis 84 may vary between stepped bore segments 88, but may generally be in a range of approximately 0.5-3.5 degrees, or more particularly in a range of approximately 1.0-1.5 degrees. In addition, it will be appreciated that the angle of the distal bore segments 90 may gradually increase or decrease along the length of the distal bore segment 90 to form a generally convex or concave shape, similar to the back inner bores 76 of FIGS. 4 and 5. Furthermore, although illustrated in FIG. 7 as including five stepped bore segments 88, in other embodiments, the contoured inner bore 70 of the contact tip 48 may include 1, 2, 3, 4, 6, 7, 8, 9, 10, or even more stepped bore segments 88.

The contact tips 48 described herein increase the electrical contact area between the contact tips 48 and the welding wire 24 delivered through the contact tips 48, which is an important consideration for certain types of welding wire 24, such as aluminum welding wire. The contact tips 48 described herein form a single body, rigid structure that is relatively inexpensive to manufacture insofar as the contoured inner bores 70 of the contact tips 48 have a gradually increasing inner diameter from the distal end 74 of the contact tip 48 to the proximal end 68 of the contact tip 48. Also, each contact tip 48 may be manufactured having an inner bore 70 that is specifically contoured to match a specific type of welding wire 24 (e.g., to account for inherent bending, twisting, and curvature properties of the specific type of welding wire 24).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding contact tip, comprising:
a conductive body configured to be secured within a welding torch and to receive a welding wire through a contoured inner bore formed through the conductive body, wherein the contoured inner bore comprises:
a first inner bore extending from a first axial end of the conductive body to a first axial location along an axis through the contoured inner bore, wherein the first inner bore comprises a first continuous inner wall having a first inner diameter that is substantially constant from the first axial end of the conductive body to the first axial location along the axis, wherein the first continuous inner wall is continuous about a first circumference of the first continuous inner wall at all points along the axis between the first axial end and the first axial location; and
a second inner bore extending from the first axial location along the axis to a second axial location along the axis, wherein the second axial location is proximate to a second axial end of the conductive body that is opposite the first axial end of the conductive body, wherein the second inner bore comprises a second continuous inner wall having a second inner diameter that increases from the first axial location to the second axial location along the axis, wherein the second continuous inner wall is continuous about a second circumference of the second continuous inner wall at all points along the axis between the first axial location and the second axial location.

2. The welding contact tip of claim 1, wherein the second continuous inner wall is angled with respect to the axis by an angle that is substantially constant from the first axial location to the second axial location along the axis.

3. The welding contact tip of claim 2, wherein the angle is approximately 1.0-2.5 degrees.

4. The welding contact tip of claim 1, wherein the second continuous inner wall is angled with respect to the axis by an angle that gradually increases from the first axial location to the second axial location along the axis.

5. The welding contact tip of claim 4, wherein the angle increases from approximately 0 degrees at the first axial location to approximately 10-40 degrees at the second axial location.

6. The welding contact tip of claim 1, wherein the second continuous inner wall is angled with respect to the axis by an angle that gradually decreases from the first axial location to the second axial location along the axis.

7. The welding contact tip of claim 6, wherein the angle decreases from approximately 10-30 degrees at the first axial location to approximately 0 degrees at the second axial location.

8. The welding contact tip of claim 1, wherein the second continuous inner wall is angled with respect to the axis by an angle that gradually increases from the first axial location to a third axial location between the first and second axial locations along the axis, and that gradually decreases from the third axial location to the second axial location along the axis.

9. The welding contact tip of claim 8, wherein the angle increases from approximately 0 degrees at the first axial location to approximately 5-15 degrees at the third axial location, and decreases from approximately 5-15 degrees at the third axial location to approximately 0 degrees at the second axial location.

10. The welding contact tip of claim 1, wherein the second continuous inner wall comprises a plurality of stepped bore segments, wherein each stepped bore segment comprises a first bore segment having a substantial constant inner diameter and a second bore segment having a gradually increasing inner diameter.

11. The welding contact tip of claim 1, wherein the first inner bore is approximately 0.3-0.6 inches long from the first axial end of the conductive body to the first axial location along the axis.

12. The welding contact tip of claim 1, wherein the second inner bore is approximately 0.6-1.0 inches long from the first axial location to the second axial location along the axis.

13. The welding contact tip of claim 1, wherein the first inner diameter is approximately 5-10% larger than an outer diameter of the welding wire for steel wire, or 10-15% larger for aluminum wire.

14. A welding contact tip, comprising:
a conductive body configured to be secured within a welding torch and to receive a welding wire through a contoured inner bore formed through the conductive body, wherein the contoured inner bore comprises:
a first inner bore extending approximately 0.3-0.6 inches from a first axial end of the conductive body to a first axial location along an axis through the contoured inner bore, wherein the first inner bore comprises a first inner wall having a first inner diameter that is substantially constant from the first axial end of the conductive body to the first axial location along the axis, and is approximately 5-10% larger than an outer diameter of the welding wire for steel wire, or 10-15% larger for aluminum wire; and
a second inner bore extending approximately 0.6-1.0 inches from the first axial location along the axis to a second axial location along the axis, wherein the second axial location is proximate to a second axial end of the conductive body that is opposite the first axial end of the conductive body, wherein the second inner bore comprises a second inner wall having a second inner diameter that increases from the first axial location to the second axial location along the axis.

15. The welding contact tip of claim 14, wherein the second inner wall is angled with respect to the axis by an angle of approximately 1.0-2.5 degrees that is substantially constant from the first axial location to the second axial location along the axis.

16. The welding contact tip of claim 14, wherein the second inner wall is angled with respect to the axis by an angle that gradually increases from approximately 0 degrees at the first axial location to approximately 10-40 degrees at the second axial location.

17. The welding contact tip of claim 14, wherein the second inner wall is angled with respect to the axis by an angle that gradually decreases from approximately 10-30 degrees at the first axial location to approximately 0 degrees at the second axial location.

18. The welding contact tip of claim 14, wherein the second inner wall is angled with respect to the axis by an angle that gradually increases from approximately 0 degrees at the first axial location to approximately 5-15 degrees at a third axial location between the first and second axial locations along the axis, and that gradually decreases from approximately 5-15 degrees at the third axial location to approximately 0 degrees at the second axial location.

19. The welding contact tip of claim 14, wherein the second inner wall comprises a plurality of stepped bore segments, wherein each stepped bore segment comprises a first bore segment having a substantial constant inner diameter and a second bore segment having a gradually increasing inner diameter.

20. A welding contact tip, comprising:
a conductive body configured to receive a welding wire through a contoured inner bore formed through the conductive body, wherein the contoured inner bore includes first and second bores, wherein the first bore comprises a substantially constant inner diameter, the second bore comprises an inner diameter that gradually increases from the first bore to an axial end of the conductive body, and a length of the second bore is at least half a total length of the conductive body.

* * * * *